(12) United States Patent  
Osburn

(10) Patent No.: US 7,318,691 B2
(45) Date of Patent: Jan. 15, 2008

(54) TOOL APPARATUS FOR MILLING MACHINE

(75) Inventor: Alan Edward Osburn, Houston, TX (US)

(73) Assignee: Engineered Spring Products, Inc., Houston, TX (US)

( * ) Notice: Subject to any disclaimer, the term of this patent is extended or adjusted under 35 U.S.C. 154(b) by 0 days.

(21) Appl. No.: 10/938,711

(22) Filed: Sep. 10, 2004

(65) Prior Publication Data

US 2006/0053619 A1   Mar. 16, 2006

(51) Int. Cl.
    *B23C 7/00* (2006.01)
(52) U.S. Cl. .................. 409/232; 408/139; 81/475
(58) Field of Classification Search ................ 29/560; 408/139; 409/232, 231; 81/473, 474, 475, 81/476
    See application file for complete search history.

(56) References Cited

U.S. PATENT DOCUMENTS

| | | | | |
|---|---|---|---|---|
| 1,608,113 | A * | 11/1926 | Nace et al. ................ 408/240 |
| 2,141,465 | A * | 12/1938 | Grey ......................... 408/135 |
| 2,369,751 | A * | 2/1945 | Olchvary, Jr. .............. 408/139 |
| 2,724,299 | A * | 11/1955 | Amtsberg .................... 81/475 |
| 3,174,599 | A * | 3/1965 | Spyridakis et al. ...... 192/56.53 |
| 3,192,802 | A * | 7/1965 | Schatzman ................. 408/140 |
| 3,214,773 | A * | 11/1965 | Benjamin et al. ......... 192/30 R |
| 3,397,588 | A * | 8/1968 | Johnson ....................... 74/376 |
| 3,441,115 | A * | 4/1969 | Gunther ....................... 464/36 |
| 3,596,542 | A * | 8/1971 | Wallace ....................... 81/474 |
| 3,613,751 | A * | 10/1971 | Juhasz ......................... 81/474 |
| 3,702,546 | A * | 11/1972 | Schnepel ..................... 464/36 |
| 3,764,152 | A * | 10/1973 | Eaves et al. ................. 279/16 |
| 3,783,253 | A * | 1/1974 | Anderson et al. ........ 318/568.1 |
| 3,787,136 | A * | 1/1974 | Steiner ........................ 408/139 |
| 3,806,973 | A * | 4/1974 | Hopkins ........................ 470/96 |
| 3,999,642 | A * | 12/1976 | Johnson ........................ 192/21 |
| 4,029,429 | A * | 6/1977 | Johnson ...................... 408/142 |
| 4,088,418 | A * | 5/1978 | Dann .......................... 408/139 |
| 4,167,218 | A * | 9/1979 | Horiuchi et al. ............ 173/213 |
| 4,262,501 | A * | 4/1981 | Vaughn et al. ............... 464/36 |
| 4,322,186 | A * | 3/1982 | Boling ........................ 408/139 |
| 4,371,354 | A * | 2/1983 | McKean ....................... 464/36 |
| 4,386,689 | A * | 6/1983 | Kato ............................ 464/36 |
| 4,507,025 | A * | 3/1985 | Fedor ............................. 408/6 |
| 4,514,115 | A * | 4/1985 | Akashi ....................... 408/139 |
| 4,531,865 | A * | 7/1985 | Johnson ..................... 408/139 |
| 4,590,826 | A * | 5/1986 | McKean ...................... 81/53.2 |
| 4,649,774 | A * | 3/1987 | Karlsson et al. ............ 475/266 |
| 4,653,358 | A * | 3/1987 | Lankry ......................... 81/474 |

(Continued)

*Primary Examiner*—Robin Evans
*Assistant Examiner*—Eric A. Gates
(74) *Attorney, Agent, or Firm*—Woodard, Emhardt, Moriarty, McNett & Henry LLP

(57) ABSTRACT

The present invention provides an automated-torque controlled tool for attachment to a milling machine. The tool comprises an elongated hollow housing defined by a neck section, a middle section, and a bottom section. The neck section is adapted to engage a spindle of the milling machine for rotational and axial movement therewith. A torque spring is situated within the middle section of the housing. A torque adjuster is dimensioned and configured to sit within the neck section of the housing on top the torque spring. A bit holder and driver mechanism are rotationally mounted within the bottom section of the housing. When the torque threshold is reached by the bit holder, the driver mechanism rotationally disengages from the bit holder.

19 Claims, 5 Drawing Sheets

U.S. PATENT DOCUMENTS

| | | | |
|---|---|---|---|
| 4,832,542 A * | 5/1989 | Johnson et al. | 408/139 |
| 5,230,142 A * | 7/1993 | Roscizewski | 29/758 |
| 5,346,022 A * | 9/1994 | Krivec | 173/178 |
| 5,354,154 A * | 10/1994 | Hartley | 408/139 |
| 5,437,524 A * | 8/1995 | Huang | 408/139 |
| 5,876,158 A * | 3/1999 | Beiter | 408/139 |
| 6,132,435 A * | 10/2000 | Young | 606/104 |
| 2007/0039426 A1 * | 2/2007 | Chuang | 81/475 |

\* cited by examiner

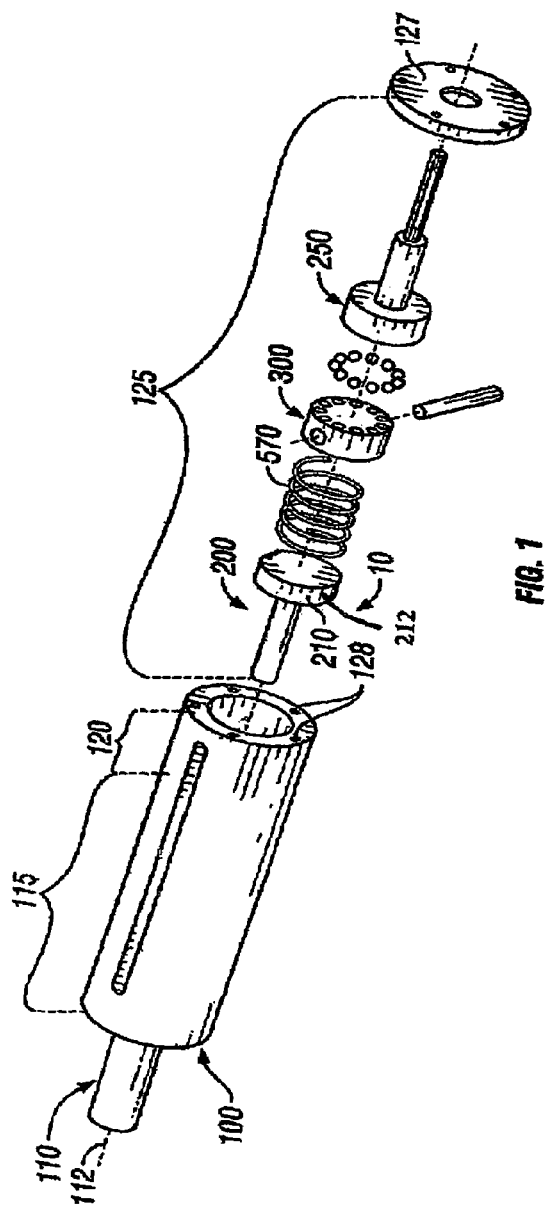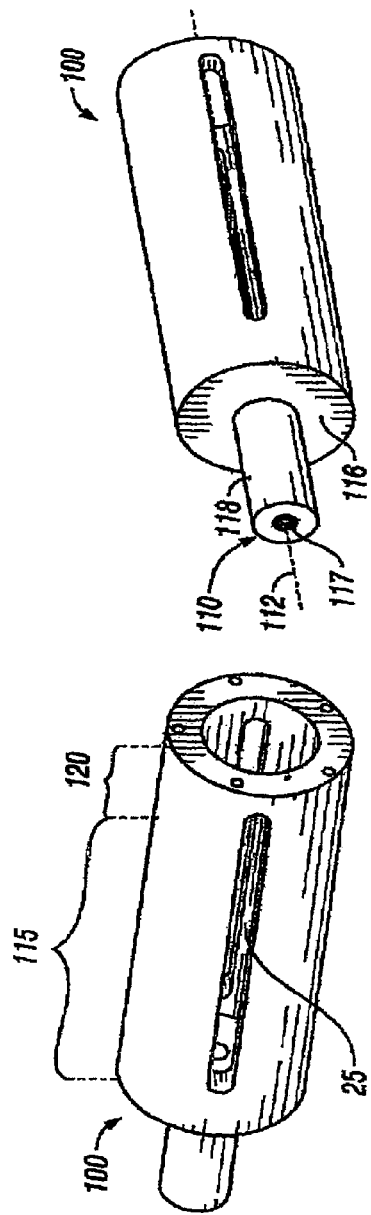
FIG. 1
FIG. 2A
FIG. 2B

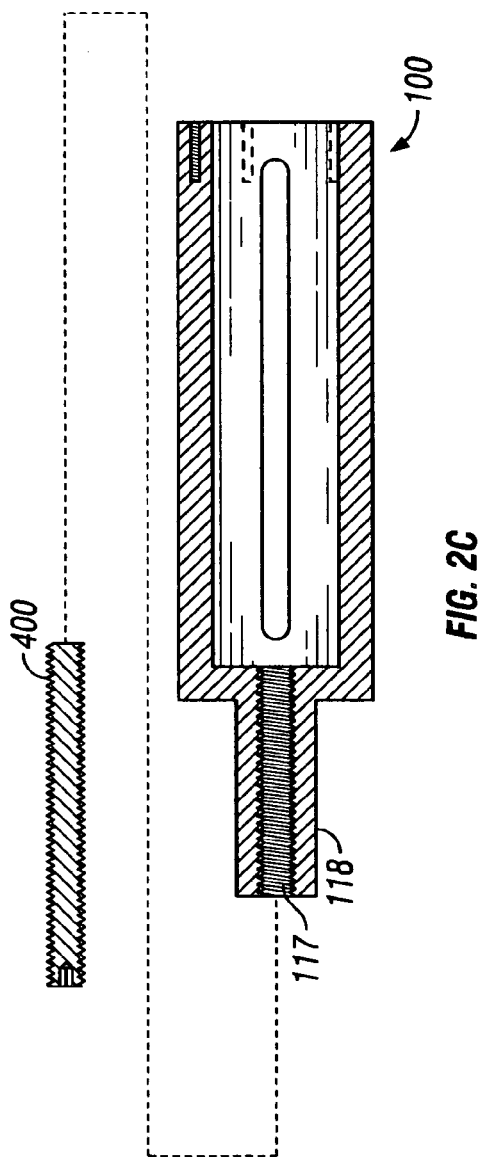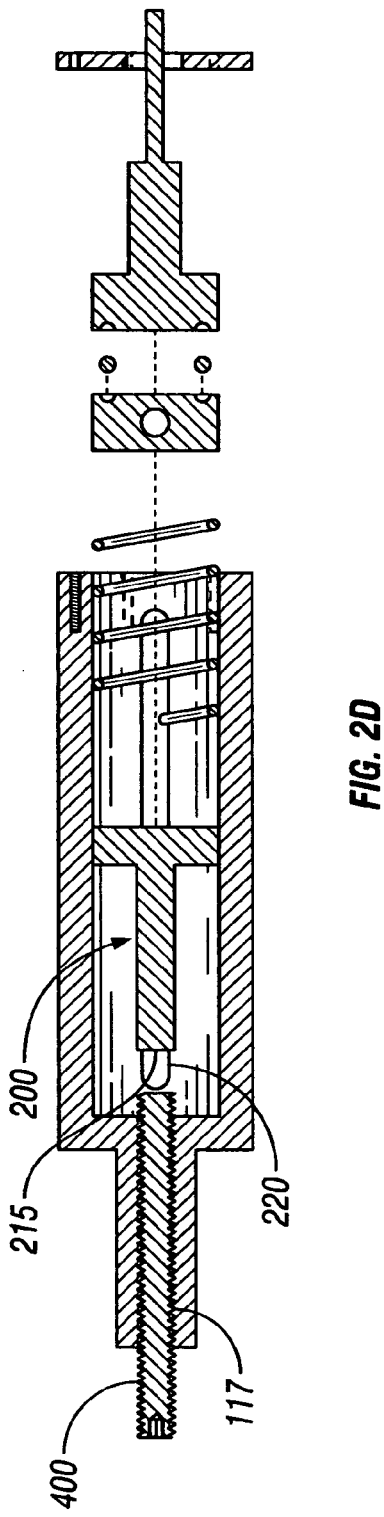

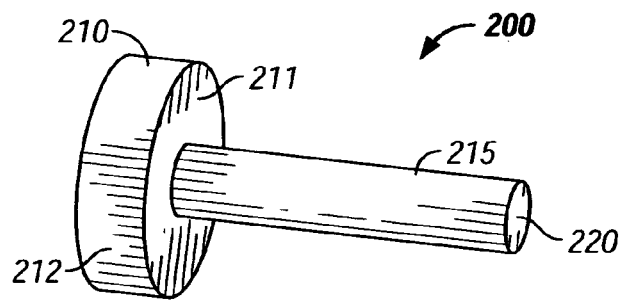
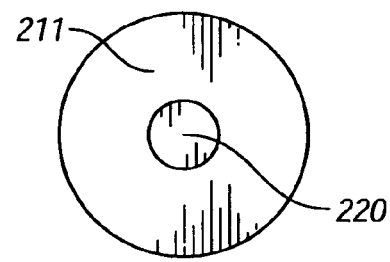
FIG. 3  FIG. 3A
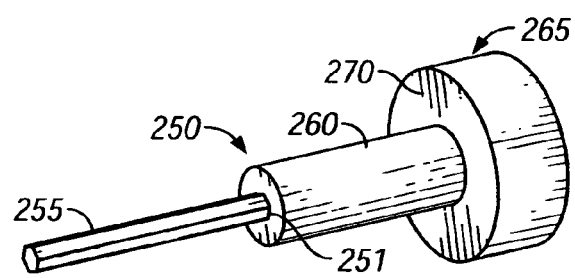
FIG. 4
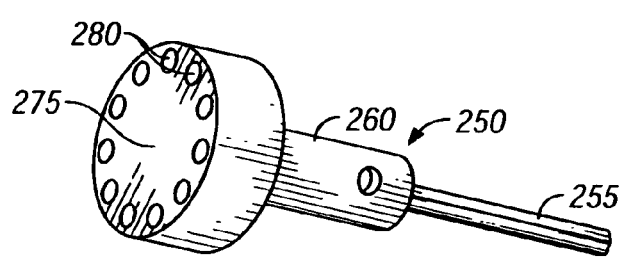
FIG. 4A

TOOL APPARATUS FOR MILLING MACHINE

BACKGROUND

This invention relates to tools for automated cutting or milling machines. Generally, milling machines are used to machine metal into finished manufactured parts. To manufacture parts quickly and efficiently, milling machines can be numerically programmed to perform repetitive production machining operations on a plurality of work pieces. Each work piece must be secured in place with some type of fastener prior to beginning the machining process. Currently, each work piece is secured in place manually with some type of work holding device such as vise, chuck, clamps etc. What is needed is a tool which can be controlled by a numerically programmed milling machine for tightening or loosening fasteners that hold work pieces in place.

SUMMARY

The present invention provides a tool for attachment to a milling machine. The tool of the present invention provides the capability of automating the tightening and the untightening of fasteners required to secure work pieces in place during the machining process. The present invention significantly decreases the time it would take to secure each work piece on the work table during the cutting process, thereby increasing production.

The tool comprises an elongated hollow housing defined by a neck section, a middle section, and a bottom section. The neck section is adapted to engage a spindle of the milling machine for rotational and axial movement therewith. A torque spring is situated within the middle section of the housing. A torque adjuster is dimensioned and configured to sit within the neck section of the housing on top the torque spring. The torque adjuster provides the capability of setting the torque spring to a predetermined torque threshold level. A bit holder is rotationally mounted to the bottom section of the housing. A driver mechanism is interposed between the bit holder and the torque spring. The driver mechanism is coupled to the bit holder for simultaneous rotation therewith. When the torque threshold is reached by the bit holder, the driver mechanism rotationally disengages from the bit holder. The system further includes a means for automatically controlling the rotation of the bit holder until the predetermined torque.

BRIEF DESCRIPTION OF DRAWINGS

FIG. 1 is a frontal view of the present invention with each component separated.

FIG. 2A is a bottom view of the barrel.

FIG. 2B is a top view of the barrel.

FIGS. 2C and 2D are cross-sectional views of the barrel.

FIG. 3 is a side view of the torque adjuster.

FIG. 3A is a top view of the torque adjuster.

FIG. 4 is a side view of the bit holder.

FIG. 4A is a top and opposite side view of the bit holder.

FIGS. 6 and 6A are an exploded bottom view of the cap and bit holder.

DETAILED SPECIFICATION

Figure 7:
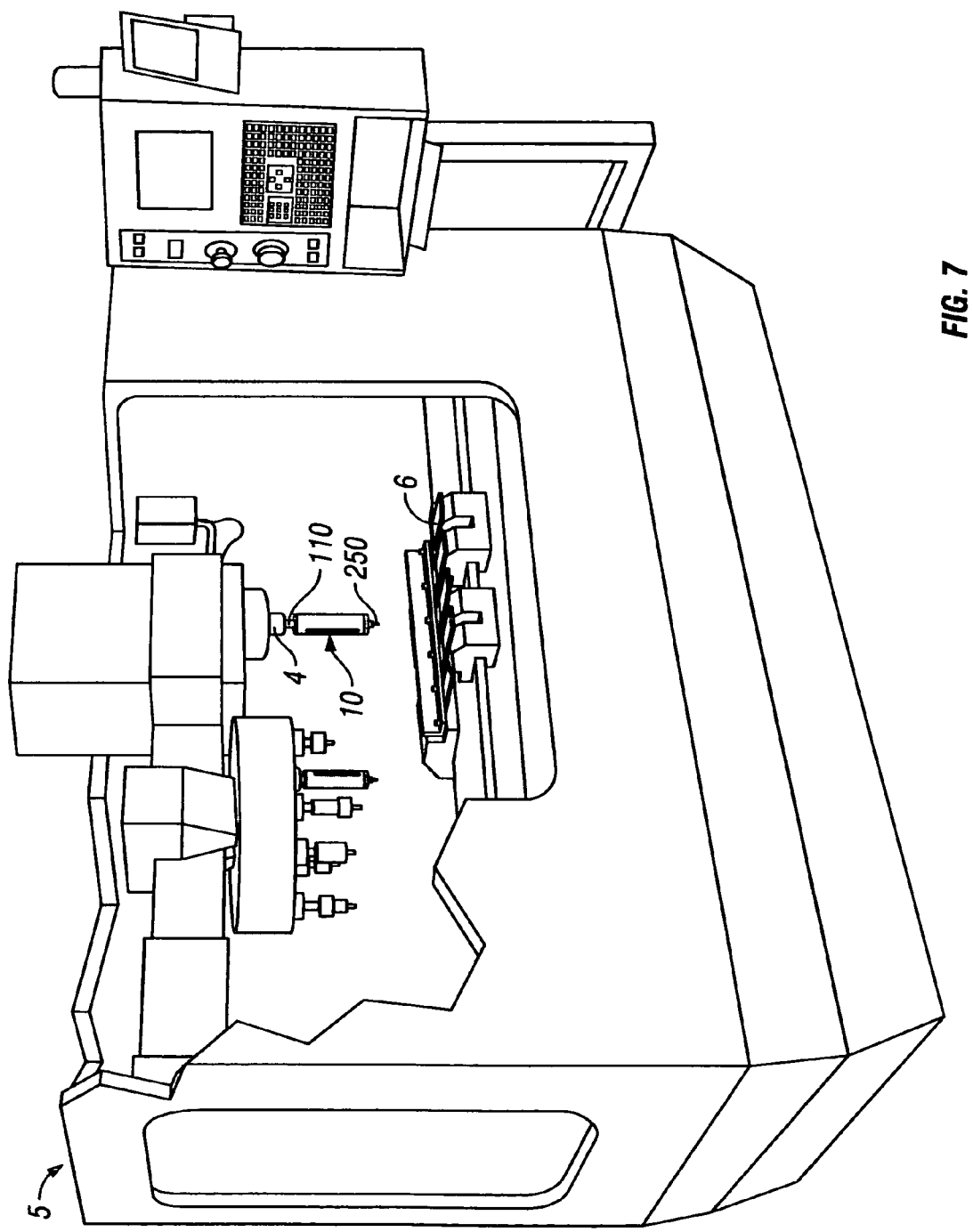
FIG. 7 illustrates a plurality of work pieces along with the tool in place above a plurality of work pieces.

Referring to FIG. 1, there is shown a frontal view of the present invention, a tool (10) attachment for an automated cutting or milling machine (5) as shown in FIG. 7 which will be described below. Tool (10) further comprises an elongated hollow barrel (100) defined by a neck section (110), a middle section (115), and a bottom section (120). The internal hollow configuration of housing (100) and cap member (127) are adapted to enclose and to support each mechanical component (125) of tool (10) as described below. Tool (10) can be made of steel alloy or another suitable material.

Referring to FIG. 2A, there is shown a frontal view of barrel (100). In the illustrated embodiment, middle section (115) and bottom section (120) of barrel (100) are cylindrical in shape. The internal diameter of section (115) encompasses torque transmitter (570) (show in FIG. 1). Bottom section (120) internal configuration is adapted to encompass driver mechanism (300) and bit holder (250) shown in FIG. 1.

Figure 6:
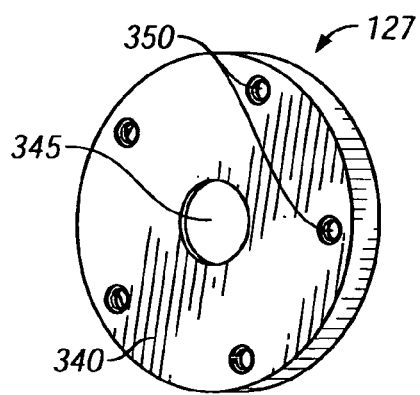
FIG. 6 is an exploded top view of the cap for the bit holder.
Figure 6A:
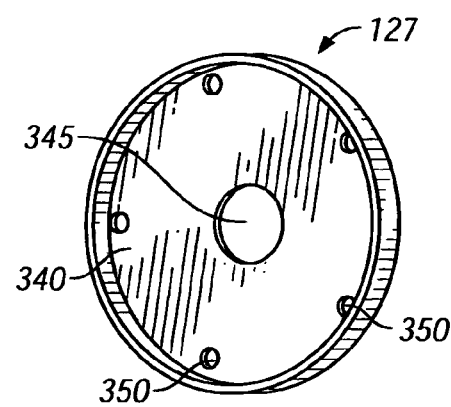

Circumferentially surrounding the bottom opening of barrel (100) is a plurality of bores (128). Each bore is adapted to support the engagement of fasteners utilized to secure cap member (127) (shown in FIG. 1) to the bottom of barrel (100). In the illustrated embodiment, each bore is threaded to support the engagement of the fasteners. Referring to FIGS. 6 and 6A cap member (127) further comprises a plurality of bores (350) which aligns over bores (128) when cap member (127) is placed over the bottom of barrel (100). Cap member (127) is then secured with fasteners which secure bit holder (250) in place. Bit holder (250) is adapted to protrude through opening (345) in cap member (127)

Referring to FIG. 2B, there is shown a top view of barrel (100). Neck section (110) of barrel (100) is formed upon the top of middle section (115). Neck section (110) further comprises lid member (116) formed upon the top of barrel (100). Tubular portion (118) is formed upon lid member (116). Tubular portion (118) projects outward to a predetermined distance from lid member (116). Internal bore (117) is formed within tubular portion (118) along axis (112).

FIG. 3 illustrates an exploded side view of one embodiment of torque adjuster (200). Torque adjuster (200) further comprises cylindrical shape plate member (210) having an upper surface area (211) and a lower surface area (212). Plate member (210) is configured and dimensioned to seat inside the top circular opening of middle section (115) of barrel (100) illustrated in FIG. 2B. As depicted, torque adjuster (200) further comprises a cylindrical elongated top portion (215) formed upon the upper surface area (211) of plate member (210). Top portion (215) projects outward from the upper surface area (211) of plate member (210) to a predetermined distance. Additionally, top portion (215) is dimensioned and configured to slide into internal bore (117) of neck section (110) illustrated in FIG. 2B.

As shown in FIGS. 2C and 2D, internal bore (117) is adapted to receive an adjustment fastener (400) which is utilized to compress and uncompress upon top surface (220) of top portion (215). The adjustment fastener (400) can be a conventional set screw. Internal bore (117) is threaded throughout its internal diameter to receive the adjustment fastener (400).

Referring back to FIG. 1, lower surface area (212) of plate member (210) sits upon torque transmitter mechanism (570). As depicted torque transmitter mechanism (570) is a spring. In operation, the adjustment fastener (400) is rotated until the desired torque threshold is achieved. The bottom of the adjustment fastener (400) sits upon lower surface (212). As the adjustment fastener (400) is rotated, the bottom of the adjustment fastener (400) compresses upon lower surface (212) which in turns compresses spring (570). Spring (570) is compressed to increase the torque threshold level and spring (570) is uncompressed to decrease the torque threshold level. As the spindle of the milling machine rotates, the spindle also moves downward to maintain the constant set torque threshold level. Referring to FIGS. 1 and 2A, barrel (100) further comprises a pair of parallel elongated slits (25). Slits (25) form an opening on each opposing side of barrel (100). In operation, an operator can view the compression of spring (570) within slits (25) of barrel (100).

Referring to FIG. 4, there is shown an exploded view of bit holder (250). Bit holder (250) further includes plate member (265) which is defined by an upper surface (275) and a lower surface (270). Plate member (265) has a cylindrical shape with a circumference dimensioned and configured to seat within bottom section (120) as shown in FIG. 1.

Referring to FIG. 4A, there is shown an exploded top view of bit holder (250). The upper surface (275) has a plurality of pockets (280) adapted to fit a plurality of ball bearings. In the present invention each ball bearing is a sphere. Each pocket (280) is adapted with sufficient depth to receive a portion of the area of each sphere. Bottom portion (260) is formed upon the lower surface (270) of the plate member (265) and projects outward to a predetermined distance therefrom.

As shown in FIG. 4, hole (251) is formed within the bottom portion (260). Hole (251) is adapted to fit bit (255). Bit (255) can be exchanged to support the tightening and untightening of a plurality of different type of fasteners utilized to secure work pieces during the machining process.

Figure 5:
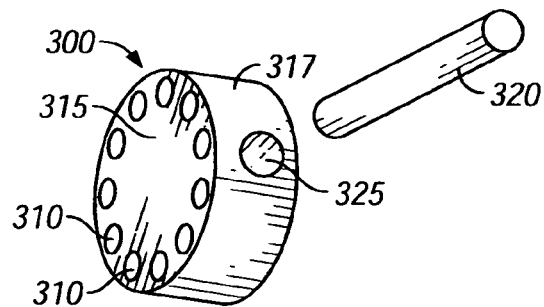
FIG. 5 is an exploded top view of the driver mechanism.
Figure 5A:
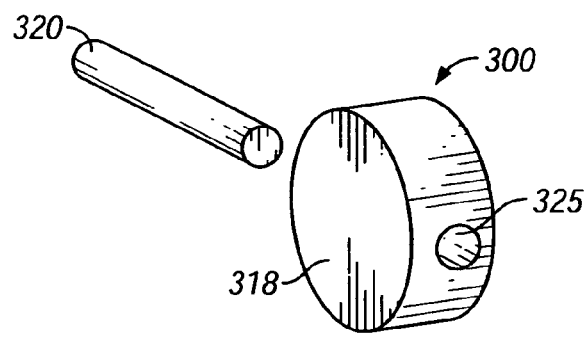
FIG. 5A is an exploded bottom view of the driver mechanism.

Referring to FIG. 5, there is shown an exploded view of driver mechanism (300). Driver mechanism (300) has a cylindrical shape with a circumference dimensioned and configured to seat within the internal diameter of bottom section (120) upon bit holder (250) as shown in FIG. 1. Driver mechanism (300) further comprises plate member (317) which is defined by an upper surface (318) and a lower surface (315). Plate member (317) is dimensioned and configured to seat within the bottom section (120) as shown in FIG. 1. The lower surface (315) of plate member (317) has a plurality of pockets (310) adapted to fit a plurality of ball bearings. Each pocket (310) is adapted with sufficient depth to receive a portion of the area of each sphere. As shown in FIG. 5A, upper surface (318) is substantially flat. Within bottom section (120), upper surface (318) abuts the bottom of spring (570) as shown in FIG. 1.

Driver mechanism (300) further comprises locking mechanism (320) for securing driver mechanism (300) in place within the internal diameter of bottom section (120) as shown in FIG. 1. As depicted, the locking mechanism (320) further comprises aperture (325) and pin (320). Aperture (325) emanates through the center of the side of plate member (317). Aperture (325) is adapted to receive pin (320) which firmly secures the driver mechanism (300). Each edge of pin (320) sits within each opposing slit (25) of barrel (100) as shown in FIG. 2A. As drive mechanism (300) rotates, each edge of pin (320) reciprocates within slit (25) as soon as the drive mechanism reaches its torque threshold.

Refer to FIG. 6 and 6A there is shown an exploded view of cap member 127. Cap member 127 is coupled to the lower end of barrel 100 as shown in FIG. 1. Bit holder 250 extends through central opening 345 as depicted in FIG. 1. Plate member 340 of cap member 127 is dimensioned to cover the lower end of barrel 100. A plurality of openings each designated as numeral 350 circumferentially surround the peripheral edge of plate 340. Additionally, a plurality of openings each designated as numeral 128 circumferentially surround the peripheral edge of barrel 100. To secure cap member 127 to lower end of barrel 100, fasteners (i.e. screws) extends through each opening 350 in plate member 340 into each opening 128 in lower end of barrel 100, thereby securing cap member 127 to barrel 100.

The system further comprises an automation component which is part of a numerical program for a milling machine. The automation component controls the rotation of the spindle until the driver mechanism (300) exceeds the predetermined torque threshold and rotationally disengages from the bit holder (250) as shown in FIG. 1. The automation component comprises two automated subcomponents (1) an automated tightening component for securing each work piece in place prior to beginning the machining process and (2) an automated untightening component for unsecuring each work piece when the machining process is over. The automated tightening component controls the placement of the tool (10) directly over each fastener (not shown) required to secure the work piece in place, the torque applied in forward direction to fastener to secure the work piece in place, and return of the tool (10) to its home position. The untightening component controls the placement of the tool (10) directly over each fastener (not shown) required to unsecure the work piece from the milling machine work table, the torque applied in a reverse direction to fastener to unsecure the work piece, and return of the tool (10) to its home position.

Referring to FIG. 7, generally, a numerical controller (270) is used to automate the operation of a milling machine. In normal operation, the operator would load the numerical program into numerical controller (270) for performing a series of operations on a work piece. The individual tools required to perform the operations are placed within a cache (272). Then, the numerical controller (270) controls the process of loading each required tool in series from the cache (272) of tools into the spindle of the milling machine, perform the operation on the work piece and return the tool back to the cache (272). At the end of the operation, the spindle of the milling machine (5) is returned to its home position.

In operation, the present invention is just another tool located in the cache. Referring to FIG. 7, the operator of the milling machine (5) chooses a bit (255) to be place within the bit holder (250). The operator compresses the torque spring to the desired torque threshold level as discussed above. The tool of the present invention is placed within the cache of the milling machine (5). Then, the numerical program including the automation component of the present invention is loaded into the numerical controller as pan of the overall machining operation. A plurality of work pieces (6) are secured in some type of holding fixture which is secured upon the work table. Finally, the operator presses the start button on the numerical controller to begin the machining process. The tool holder (4) of the milling machine (5) is adapted to engage neck section (110) for rotational and axial movement along the central axis line. The tool (10) performs the tightening and untightening of work pieces (6) as part of the overall machining process. FIG. 8 shows an illustration of the automated process used by the automated milling machine using the device.

What is claimed is:

1. A tool, comprising: an elongate body having a central longitudinal axis, said body having an upper end and a lower end spaced along the axis and a sidewall defining an interior chamber between said ends; two parallel elongate slits defined in said sidewall on opposing sides of said axis; a neck section integrally formed at said upper end of said elongate body wherein said neck section is attachable to a rotational machine to rotate said body around the axis; a bit holder rotationally mounted within said interior chamber and configured to retain a bit extending outwardly from said lower end of said body along the axis; a driver mechanism situated within said hollow interior chamber and engaged to transmit rotational force imparted to said body to said bit holder, wherein said driver mechanism includes a cylindrical plate having an internal diameter rotationally seated within the internal diameter of said interior chamber and a locking pin with a central portion passing through said cylindrical plate and opposing ends received in said longitudinal slits; a breakaway mechanism arranged between said driver mechanism and said bit holder wherein said breakaway mechanism rotationally disengages said driver mechanism from said bit holder when the transmitted rotational force exceeds a preset torque threshold and wherein during said disengagement said locking pin opposing ends reciprocate within said longitudinal slits to increase the spacing between said cylindrical plate and said bit holder; a torque threshold adjustment mechanism, wherein said mechanism is adjustable to compress said driver mechanism against said bit holder along the length of said interior chamber to preset the torque threshold; and, a set screw engaged between an internal bore through said upper end and against a top surface of said torque threshold adjustment mechanism, wherein said set screw is adjustable to adjust said torque threshold adjustment mechanism.

2. The tool of claim 1, wherein said breakaway mechanism comprises a plurality of ball bearings arranged between said driver mechanism and said bit holder.

3. The tool of claim 2, wherein said torque threshold adjustment mechanism comprises a torque adjuster with a plate member perpendicular to the axis and a spring engaged between said plate member and said driver mechanism.

4. The tool of claim 3, wherein said set screw engages said torque adjuster and is rotatable to adjust the advancement of said plate member.

5. The tool of claim 4, wherein said set screw is engaged with an inner bore of said upper end aligned with the axis and passing through said neck section.

6. The tool of claim 5, wherein said torque adjuster includes an top portion projecting outwardly towards said neck section along the axis in alignment with said set screw.

7. The tool of claim 3, wherein said bit holder is compressed against said lower end by said a torque threshold adjustment mechanism.

8. The tool of claim 1, wherein said driver mechanism includes a cylindrical plate having a diameter rotationally seated within said interior chamber, and a locking pin with a central portion passing through said cylindrical plate and opposing ends received in opposing sidewall portions of said interior chamber.

9. A tool, comprising: an elongate body having a central longitudinal axis, said body having an upper end and a lower end spaced along the axis and a sidewall defining an interior chamber between said ends, at least said lower end being closed; two parallel elongate slits defined in said sidewall on opposing sides of said axis; a bit holder rotationally mounted within said interior chamber and extending outwardly through an opening defined in said lower end of said body, wherein said bit holder is configured to fit a bit aligned with the axis; a torque transmitter situated within said hollow interior chamber and engaged to transmit rotational force imparted to said body to said bit holder; a driver mechanism including a cylindrical plate having an internal diameter rotationally seated within the internal diameter of said interior chamber and a locking pin with a central portion passing through said cylindrical plate and opposing ends received in said longitudinal slits; a breakaway mechanism arranged between said torque transmitter and said bit holder wherein said breakaway mechanism rotationally disengages said torque transmitter from said bit holder when the transmitted rotational force exceeds a preset torque threshold and wherein during said disengagement said locking pin opposing ends reciprocate within said longitudinal slits to increase the spacing between said cylindrical plate and said bit holder; a torque threshold adjustment mechanism, wherein said mechanism is adjustable along the length of said interior chamber to selectively compress and decompress said torque transmitter against said bit holder to preset the torque threshold; and, a set screw engaged between an internal bore through said upper end and against a top surface of said torque threshold adjustment mechanism wherein said set screw is adjustable to adjust said torque threshold adjustment mechanism.

10. The tool of claim 9, comprising a set screw engaged through said upper end of said body, wherein said set screw engages said torque threshold adjustment mechanism and is rotatable to adjust the advancement of said torque threshold adjustment mechanism.

11. The tool of claim 9, wherein said hollow interior chamber has a cylindrical cross-section with a diameter perpendicular to the axis and wherein said bit holder comprises:
a cylindrical plate having an internal diameter rotationally seated within the internal diameter of said interior chamber; and,
an outward portion extending from said cylindrical plate and protruding through said lower end, wherein said outward portion is adapted to fit a bit.

12. The tool of claim 11, wherein said bit holder cylindrical plate is compressed against said lower end.

13. The tool of claim 9, wherein said lower end is closed with a cap secured to said body member with an opening defined in said cap through which said bit holder extends.

14. The tool of claim 13, wherein said upper end is closed with a neck section attachable to a rotational machine to rotate said body around the axis.

15. A tool, comprising:
an elongate body having a central longitudinal axis, said body having an upper end and a lower end spaced along the axis and a sidewall defining a cylindrical interior chamber;
two parallel elongate slits defined in said sidewall on opposing sides of said axis;
a bit holder rotationally mounted within said interior chamber, wherein said bit holder is configured to fit a bit aligned with the axis;
a driver mechanism situated within said hollow interior chamber and engaged to transmit rotational force imparted to said body to said bit holder, wherein said driver mechanism includes a cylindrical plate having diameter rotationally seated within the internal diameter of said interior chamber and a locking pin with a central portion passing through said cylindrical plate and opposing ends received in said longitudinal slits; and, a breakaway mechanism arranged between said driver mechanism and said bit holder wherein said breakaway mechanism rotationally disengages said driver mechanism from said bit holder when the transmitted rotational force exceeds a preset torque threshold and wherein during said disengagement said locking pin opposing ends reciprocate within said longitudinal slits to increase the spacing between said cylindrical plate and said bit holder.

16. The tool of claim 15, wherein said breakaway mechanism comprises a plurality of ball bearings arranged between opposing pairs of pockets defined in said driver mechanism and said bit holder.

17. The tool of claim 15, comprising a torque threshold adjustment mechanism engaging said driver mechanism within said interior chamber.

18. The tool of claim 17, where said torque threshold adjustment mechanism comprises a torque adjuster with a plate member parallel to said cylindrical plate of said driver mechanism, and a spring engaged between said plate member and said driver mechanism.

19. The tool of claim 18, comprising a set screw engaged with an internal bore of said neck section, wherein said set screw engages said torque adjuster and is rotatable to adjust the compression between said torque adjuster and said driver mechanism.

* * * * *